United States Patent
Haynes et al.

(10) Patent No.: US 10,233,666 B2
(45) Date of Patent: Mar. 19, 2019

(54) TELESCOPIC CANOPY SUPPORT FOR AN INFLATABLE EVACUATION DEVICE

(71) Applicant: Goodrich Corporation, Charlotte, NC (US)

(72) Inventors: Timothy C Haynes, Prescott Valley, AZ (US); Daniel Bahena, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 215 days.

(21) Appl. No.: 15/383,547

(22) Filed: Dec. 19, 2016

(65) Prior Publication Data

US 2018/0171657 A1    Jun. 21, 2018

(51) Int. Cl.
| | |
|---|---|
| B64D 25/00 | (2006.01) |
| E04H 15/44 | (2006.01) |
| B64D 25/14 | (2006.01) |
| B64D 25/18 | (2006.01) |
| B63B 27/14 | (2006.01) |
| B63C 9/04 | (2006.01) |

(52) U.S. Cl.
CPC .............. *E04H 15/44* (2013.01); *B64D 25/14* (2013.01); *B64D 25/18* (2013.01); *B63B 2027/145* (2013.01); *B63C 2009/042* (2013.01)

(58) Field of Classification Search
CPC ........ B63C 2009/042; B63C 2009/044; B63C 9/04; B63B 2027/145; B63B 35/58; B64D 25/00; B64D 25/14; A62B 1/00; A62B 1/20
See application file for complete search history.

(56) References Cited

U.S. PATENT DOCUMENTS

| | | | | |
|---|---|---|---|---|
| 2,764,766 A | * | 10/1956 | Boyle | B63B 27/14 |
| | | | | 182/113 |
| 2,859,457 A | * | 11/1958 | Manhart | B63C 9/02 |
| | | | | 441/38 |
| 3,827,094 A | * | 8/1974 | Fisher | A62B 1/20 |
| | | | | 182/48 |
| 3,833,088 A | * | 9/1974 | Chacko | B64D 25/14 |
| | | | | 182/48 |

(Continued)

FOREIGN PATENT DOCUMENTS

| | | |
|---|---|---|
| DE | 19610875 A1 | 9/1997 |
| GB | 1167294 A | 10/1969 |

OTHER PUBLICATIONS

EP Search Report dated Mar. 6, 2018 EP App No. 17208504.5.

*Primary Examiner* — Richard R. Green
*Assistant Examiner* — Michael A. Fabula
(74) *Attorney, Agent, or Firm* — Snell & Wilmer L.L.P.

(57) ABSTRACT

A canopy support for an inflatable evacuation device may comprise a first canopy support segment and a second canopy support segment configured to fit at least partially within the first canopy support segment when the canopy support is in a stowed state and configured to interlock with the first canopy support segment in an extended position when the canopy support is in a deployed state. The first canopy support segment may include a first interlocking portion. The second canopy support segment may include a second interlocking portion. The second interlocking portion may be configured to mate with the first interlocking portion.

17 Claims, 11 Drawing Sheets

(56) References Cited

U.S. PATENT DOCUMENTS

| | | | | |
|---|---|---|---|---|
| 3,894,614 A * | 7/1975 | Naka | ............... | A62B 1/00 |
| | | | | 182/78 |
| 4,332,049 A * | 6/1982 | Fisher | ............... | A62B 1/20 |
| | | | | 169/48 |
| 4,519,782 A * | 5/1985 | Fisher | ............... | A62B 1/20 |
| | | | | 182/48 |
| 4,650,034 A * | 3/1987 | D'Avanzo | ............... | A62B 1/20 |
| | | | | 182/49 |
| 4,678,443 A * | 7/1987 | Edwards | ............... | B63C 9/04 |
| | | | | 441/38 |
| 4,846,422 A * | 7/1989 | Fisher | ............... | B64D 25/14 |
| | | | | 244/137.2 |
| 5,360,186 A * | 11/1994 | Danielson | ............... | B64D 25/14 |
| | | | | 193/25 B |
| 5,738,305 A * | 4/1998 | Pruitt | ............... | A62B 1/20 |
| | | | | 182/48 |
| 5,921,830 A * | 7/1999 | Shoaff | ............... | B63C 9/02 |
| | | | | 441/37 |
| 6,298,970 B1 * | 10/2001 | Targiroff | ............... | B64D 25/14 |
| | | | | 182/48 |
| 6,536,715 B1 * | 3/2003 | Moran | ............... | B64D 25/14 |
| | | | | 182/48 |
| 6,966,414 B2 * | 11/2005 | Zonneveld | ............... | A62B 3/00 |
| | | | | 193/25 A |
| 2005/0115794 A1 * | 6/2005 | Zonneveld | ............... | A62B 3/00 |
| | | | | 193/5 |
| 2011/0011673 A1 * | 1/2011 | Rasmussen | ............... | A62B 1/20 |
| | | | | 182/48 |
| 2014/0366341 A1 * | 12/2014 | Rivault | ............... | B64D 25/14 |
| | | | | 24/714.7 |
| 2018/0079513 A1 * | 3/2018 | Volny | ............... | B64D 25/14 |

* cited by examiner

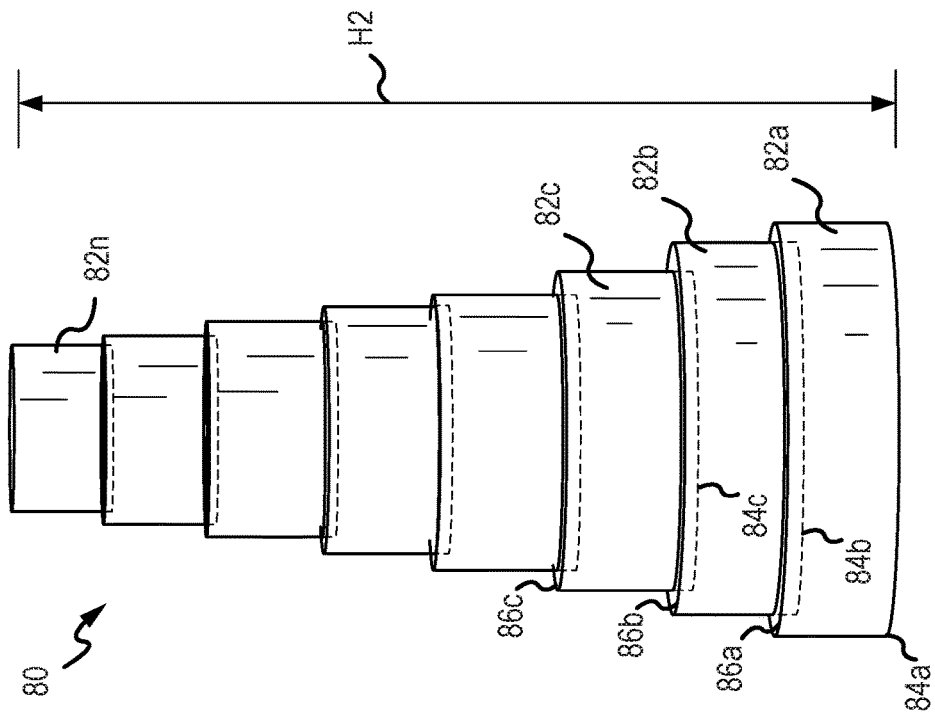
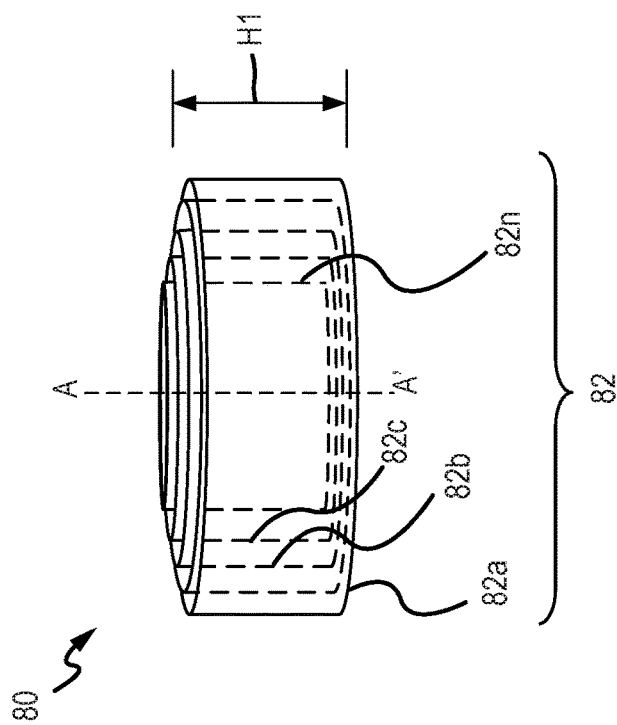
FIG.3B
FIG.3A

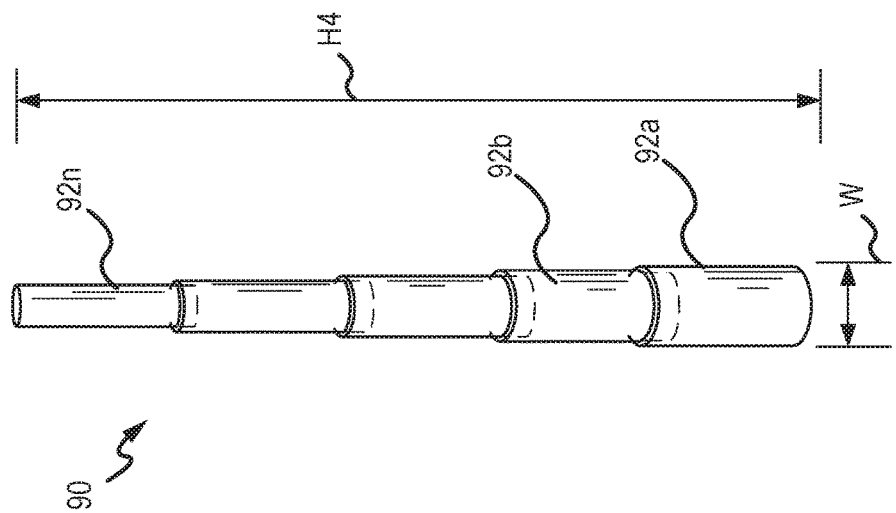
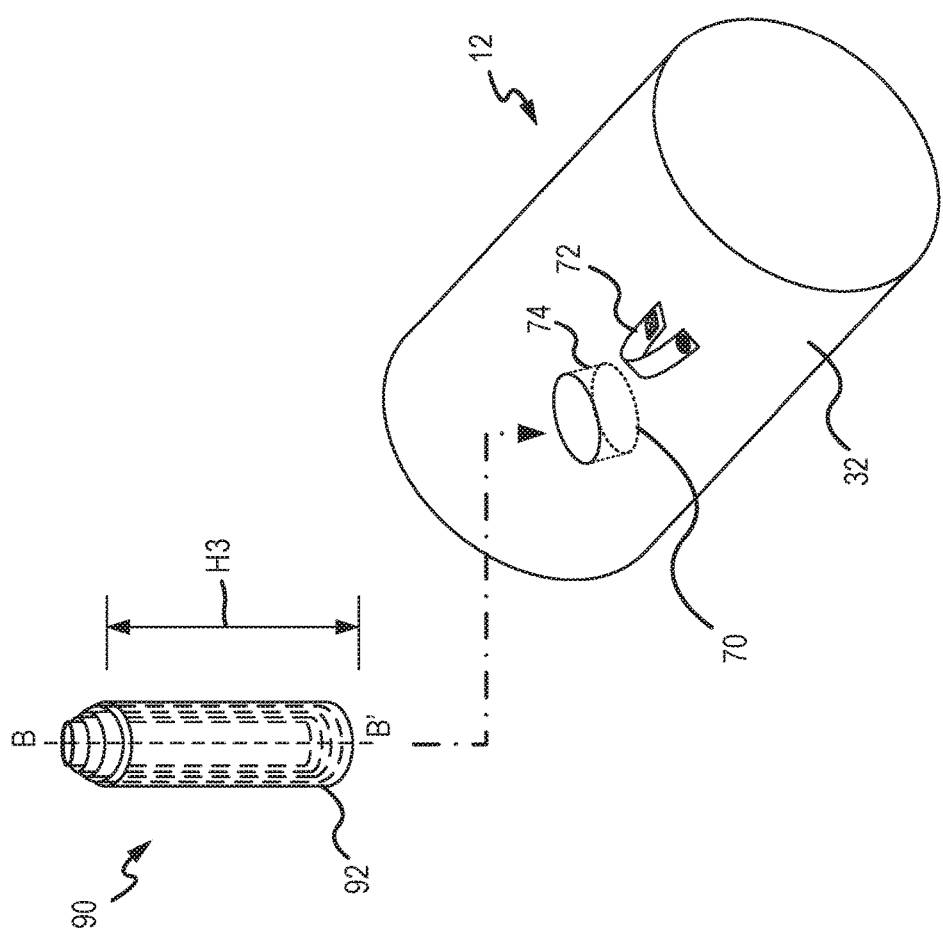

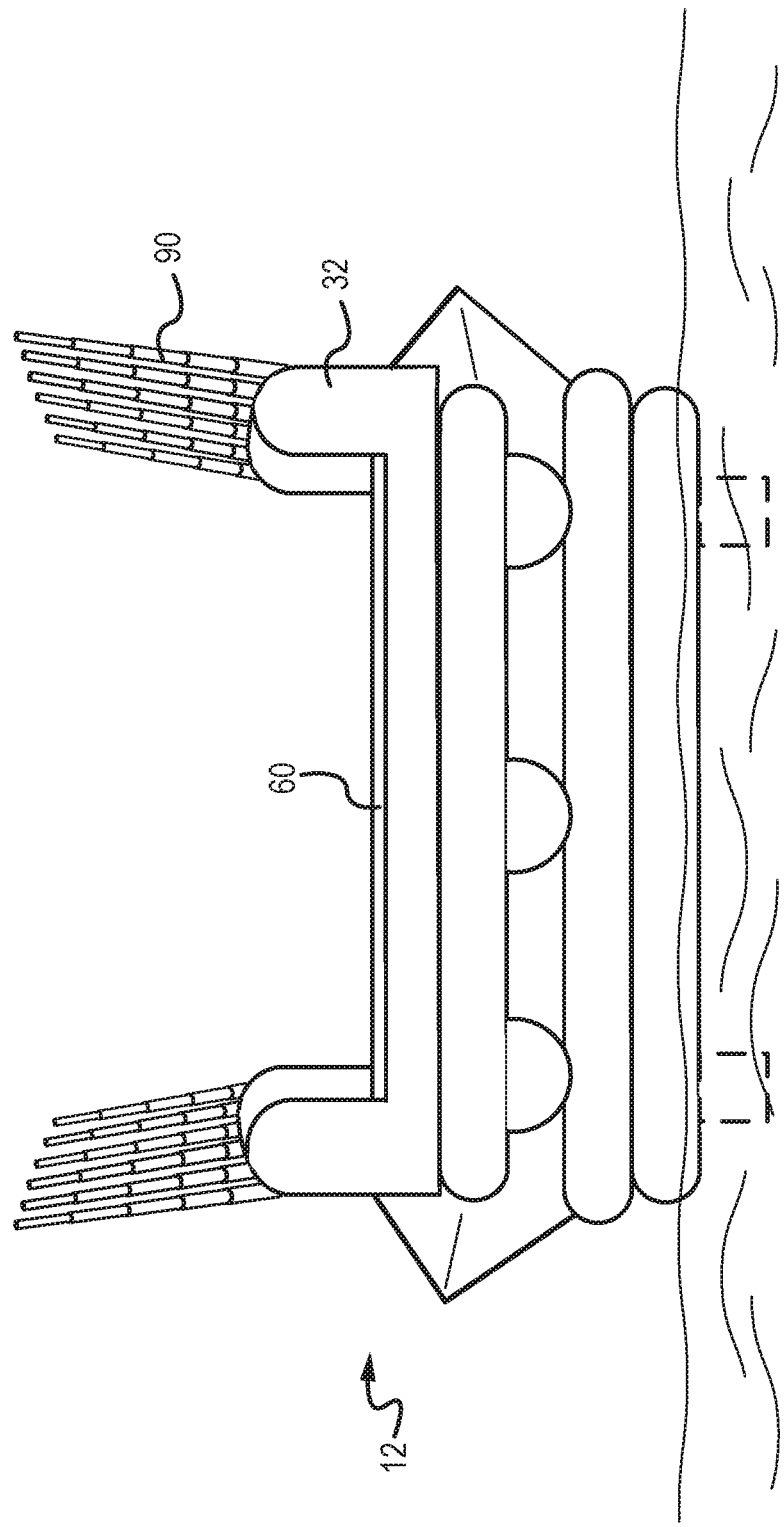

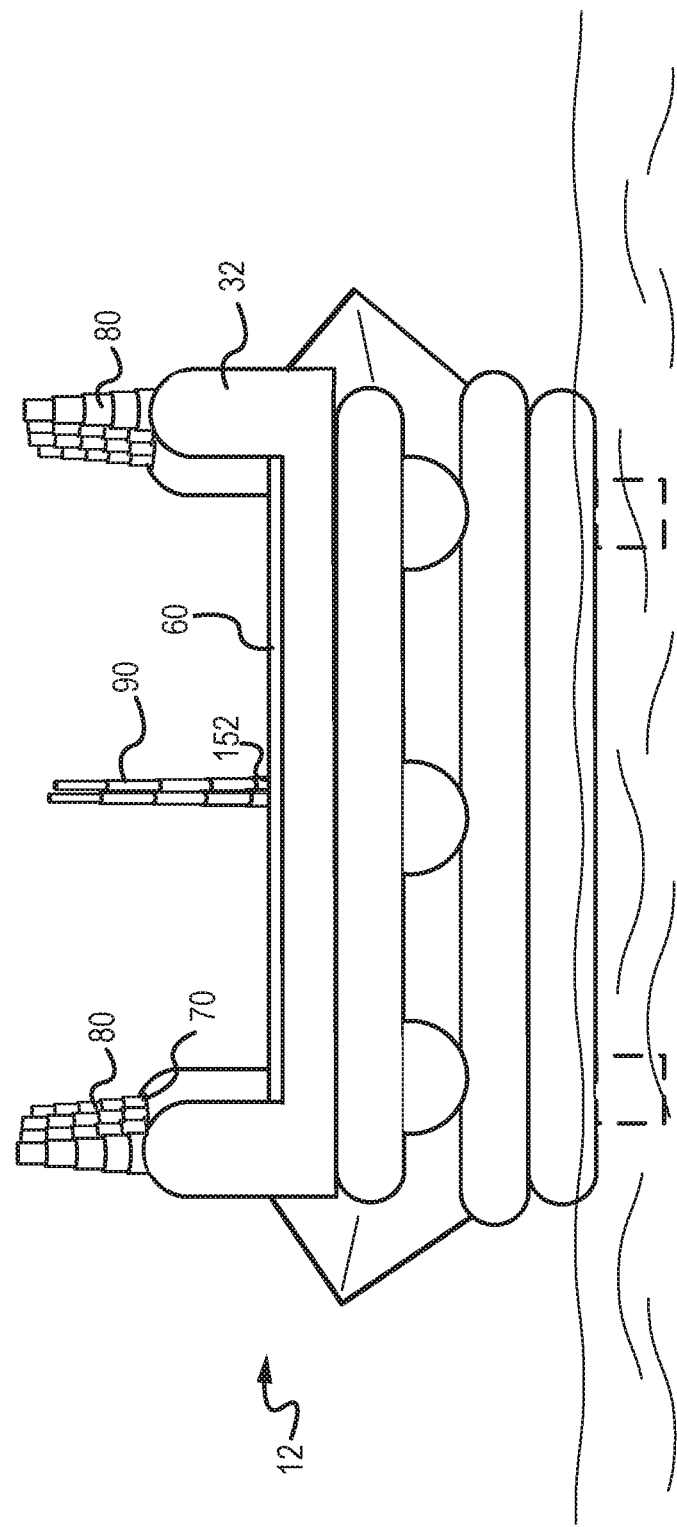

TELESCOPIC CANOPY SUPPORT FOR AN INFLATABLE EVACUATION DEVICE

FIELD

The present disclosure relates to emergency evacuation equipment for aircraft and, more specifically, to canopy supports for an evacuation device.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. An inflation source, such as a compressed air cylinder, is typically packed with the evacuation slide within a small space in the aircraft. The evacuation system may deploy from the side of an aircraft fuselage, for example. An inflatable evacuation slide may have sufficient beam strength to withstand high wind conditions and passenger loads imposed on the slide. In the event of a water landing, various emergency evacuation slides, such as slide rafts, may also be detached from the aircraft to be used as a life raft. Slide rafts may include a canopy, which protects evacuees from the sun and other elements while the slide raft is used as a flotation device. A canopy for a slide raft may be supported by one or more support members. Inflatable support members may be filled with compressed gas during deployment of a slide raft.

SUMMARY

A canopy support for an inflatable evacuation device is described herein, in accordance with various embodiments. The canopy support for an inflatable evacuation device may comprise a first canopy support segment and a second canopy support segment configured to fit at least partially within the first canopy support segment when the canopy support is in a stowed state and configured to interlock with the first canopy support segment in an extended position when the canopy support is in a deployed state.

In various embodiments, an axial end of the first canopy support segment may interlock with an axial end of the second canopy support segment when the canopy support is in the deployed state. The first canopy support segment may include a first interlocking portion. The second canopy support segment may include a second interlocking portion. The second interlocking portion may be configured to mate with the first interlocking portion. The first interlocking portion may comprise a protrusion on an inner surface of the first canopy support segment. The second interlocking portion may comprise a recess in an outer surface of the second canopy support segment. A third canopy support segment may be configured to fit at least partially within the second canopy support segment when the canopy support is in the stowed state and may be configured to interlock with the second canopy support segment in the extended position when the canopy support is in the deployed state. A stowed height of the canopy support in the stowed state may be between 10.2 centimeters to 15.2 centimeters. A deployed height of the canopy support in the deployed state may be between 50.8 centimeters to 88.9 centimeters. The canopy support may be comprised of at least one of aluminum or polyamide.

An evacuation system is also provided. The evacuation system may comprise an inflatable evacuation device including a canopy support attachment. A canopy support may be coupled to the canopy support attachment. The canopy support may comprise a first canopy support segment in a telescoping arrangement with a second canopy support segment. The second canopy support segment may be configured to fit at least partially within the first canopy support segment when the canopy support is in a stowed state. The second canopy support segment may be configured to interlock with the first canopy support segment in an extended position when the canopy support is in a deployed state. An axial end of the first canopy support segment may interlock with an axial end of the second canopy support segment when the canopy support is in the deployed state. A stowed height of the canopy support in the stowed state may be between 10.2 centimeters to 15.2 centimeters. A deployed height of the canopy support in the deployed state may be between 50.8 centimeters to 88.9 centimeters. The canopy support further may comprise a third canopy support segment in the telescoping arrangement with the first canopy support segment and the second canopy support segment. A canopy may be configured to couple to the canopy support. The inflatable evacuation device may comprise an slide raft.

A method of supporting a canopy of an inflatable evacuation device may comprise disposing a canopy support site on the inflatable evacuation device, and coupling a first canopy support segment in a telescoping arrangement with a second canopy support segment to form a canopy support.

In various embodiments, the second canopy support segment may be configured to fit at least partially within the first canopy support segment when the canopy support is in a stowed state. The canopy support may comprise a plurality of canopy support segments in a telescoping arrangement such that the plurality of canopy support segments are configured to be telescopically extended and locked into the extended position. The canopy support may be configured to fit into the canopy support site. The inflatable evacuation device may comprise a slide raft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A and 3B illustrate a telescoping canopy support including a plurality of canopy support segments in a stowed position and a deployed position respectively, in accordance with various embodiments;

FIGS. 4A and 4B illustrate a telescoping canopy support including a plurality of canopy support segments in a stowed position and a deployed position respectively, in accordance with various embodiments;

FIGS. 6A, 6B, 6C and 6D illustrate inflatable evacuation devices with canopy supports, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine. With reference to an aircraft evacuation slide, "proximal" refers to a head end, and "distal" refers to a toe end.

The present disclosure relates to canopy supports (also referred to as canopy stubs or canopy support tubes) used for evacuation devices, such as inflatable emergency evacuation slides/rafts. The canopy supports are telescoping and are configured to be collapsed for storage within a canopy pouch. The canopy supports are stored during deployment of a slide raft. When the slide raft is detached from an aircraft and used as a raft, the canopy supports and canopy may be installed by evacuees. The canopy supports are configured to be manually extended and installed on the inflatable evacuation device. The canopy supports further include self-interlocking features for ease of deployment and installation as well as for strength and support for the canopy. The telescoping configuration of the disclosed canopy supports allows the canopy supports to occupy less space in a canopy pouch when the canopy supports are collapsed and stowed.

Figure 1:
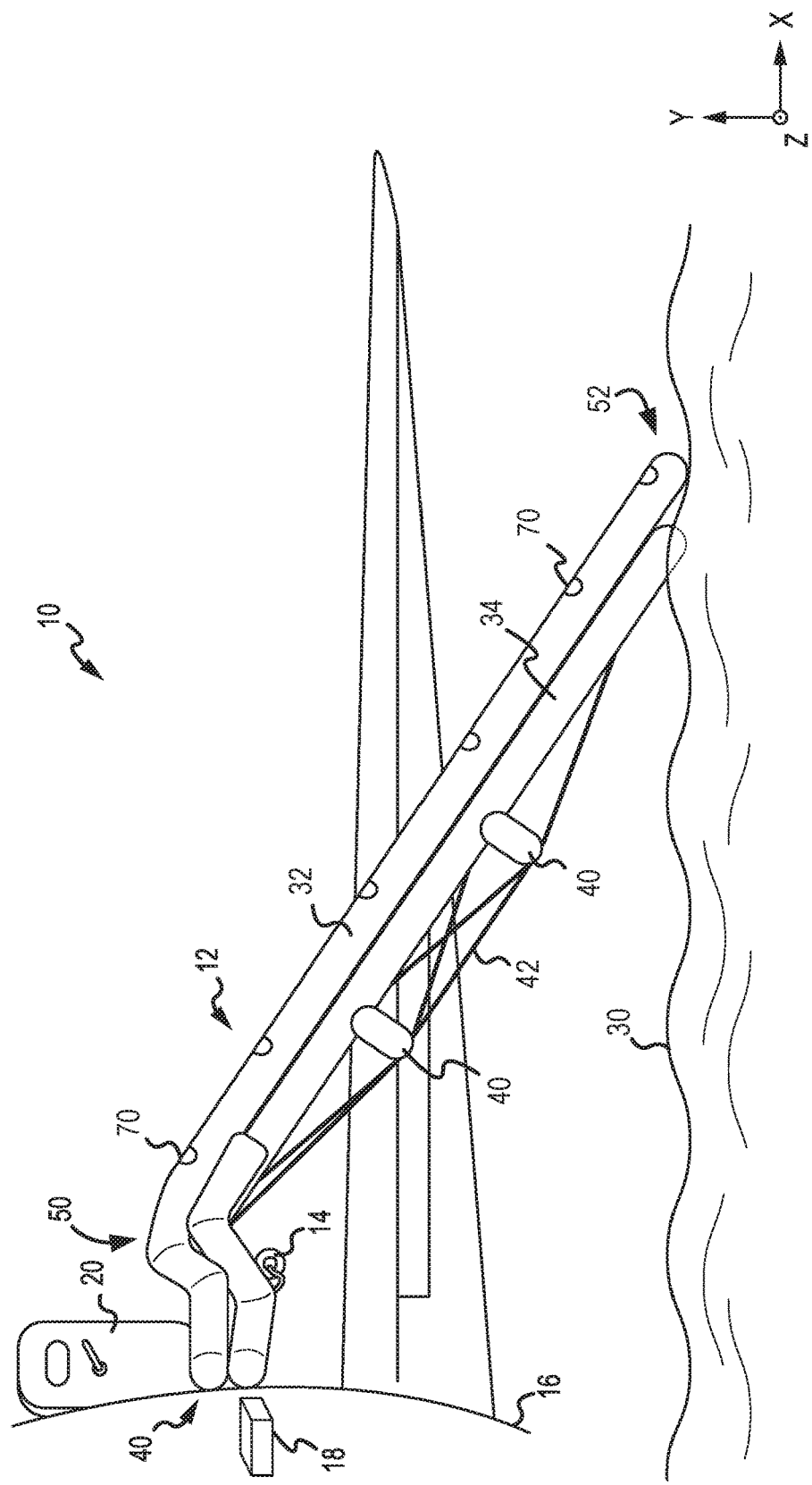
FIG. 1 illustrates a partial front view of an exemplary evacuation system for an aircraft, in accordance with various embodiments.

With reference to FIG. 1, a partial front view of an aircraft having an evacuation system 10 is illustrated, in accordance with various embodiments. Evacuation system 10 may include an inflatable evacuation device 12, which may be a slide, a slide raft, a life raft, a floatation device or other evacuation device, which may be inflatable. According to various embodiments, inflatable evacuation device 12 may be used for emergency evacuation of an aircraft 16 and may be configured to pack within a compartment of the aircraft 16 (i.e. an aircraft door, a slide bustle, etc.). Evacuation system 10 may include an inflation source 14 coupled to inflatable evacuation device 12 and configured to inflate the inflatable evacuation device 12. Inflation source 14 may be a compressed gas tank, an inflation cylinder, pyrotechnic apparatus or other suitable inflation device. Evacuation system 10 may further include a canopy pouch 18, which may be coupled to inflatable evacuation device 12 and may store a canopy 150 and canopy supports 80, 90 (see FIGS. 6A-6C).

Evacuation system 10 including inflatable evacuation device 12, inflation source 14 and canopy pouch 18 may be stored in an undeployed condition in a packboard housing inside the fuselage of aircraft 16. In various embodiments, for example, an evacuation system 10 may deploy the inflatable evacuation device 12 in response to an emergency exit door 20 opening. Upon initial deployment, inflation source 14 may deliver a pressurized gas to at least partially fill inflatable evacuation device 12 with the pressurized gas. In various embodiments, inflatable evacuation device 12 may be inflated during initial deployment to a pressure, for example, between 2 pounds per square inch (psi) or 13.8 kilopascals (kPA) and 5 psi (34.5 kPA), and more specifically, to a pressure of about 3 psi (20.7 kPA), wherein "about" in this context only means+/−0.5 psi.

In an initial deployed state, inflatable evacuation device 12 may operate as a slide (i.e., "slide mode") to permit egress of passengers from aircraft 16. Inflatable evacuation device 12 may extend from an exit location at an emergency exit door 20 and slope downward (in the negative y-direction) toward an exit surface 30. The exit surface 30 may be water, a runway, uneven terrain or other surface, for example. Inflatable evacuation device 12 may comprise at least one chamber, such as an upper chamber 32 and/or a lower chamber 34. Each of upper chamber 32 and lower chamber 34 may be configured to inflate by receiving pressurized gas from inflation source 14. Upper chamber 32 may be a separate chamber from lower chamber 34, such that lower chamber 34 is fluidly isolated from upper chamber 32. Upper chamber 32 and/or lower chamber 34 may include longitudinal tubes (also referred to as side rails) extending from a head end or proximal end 50 of inflatable evacuation device 12 to a toe end or distal end 52 of inflatable evacuation device 12. A proximal end 50 of inflatable evacuation device 12 may be secured to aircraft 16, such as by a girt. A distal end 52 of inflatable evacuation device 12 may reach exit surface 30.

In various embodiments, lower chamber 34 may include additional support tubes 40 configured to prevent inflatable evacuation device 12 from buckling under heavy load. A plurality of straps 42 may couple to lower chamber 34 and may operate as tension members to support inflatable evacuation device 12 against buckling under heavy loads. Support tubes 40 may be configured to inflate by receiving pressurized gas from inflation source 14.

Figure 2:
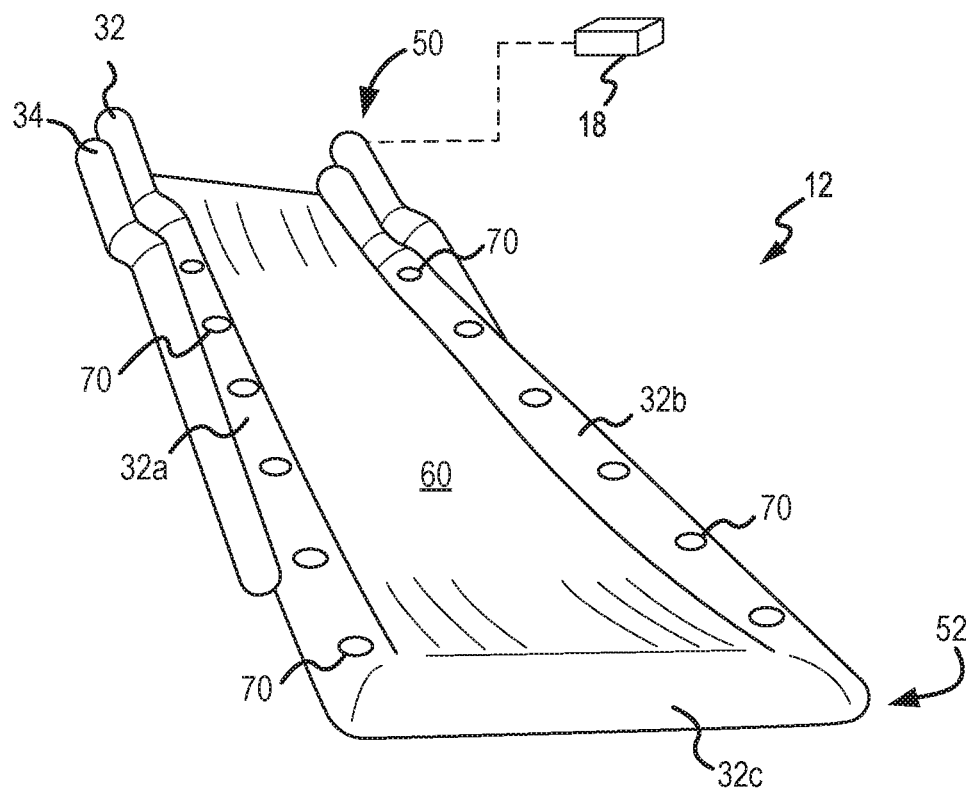
FIG. 2 illustrates a perspective view of an inflatable evacuation device having at least one canopy support attachment, in accordance with various embodiments.

With reference to FIG. 2, an inflatable evacuation device 12 is shown, in accordance with various embodiments. Upper chamber 32 may include a plurality of tubes comprising one continuous gas fillable chamber. Lower chamber 34 may also include a plurality of tubes comprising another continuous gas fillable chamber. A sliding surface 60 may be supported by upper chamber 32, lower chamber 34 or by both upper chamber 32 and lower chamber 34. Upper chamber 32, lower chamber 24 and sliding surface 60 may be comprised of a flexible fabric. The flexible fabric may comprise a base cloth with coating, such as nylon or ballistic nylon coated in polyurethane, neoprene and/or aluminum or other suitable coating.

In various embodiments, upper chamber 32 may include longitudinal tubes 32a, 32b extending from a proximal end 50 of inflatable evacuation device 12 to distal end 52 of inflatable evacuation device 12. Upper chamber 32 may further include one or more transverse tubes 32c extending between longitudinal tubes 32a, 32b. Longitudinal tubes 32a, 32b may be maintained in a spaced-apart configuration by transverse tubes 32c, for example, located at a proximal end 50 and at a distal end 52 of inflatable evacuation device 12. Sliding surface 60 may be coupled to and bordered by longitudinal tubes 32a, 32b and transverse tubes 32c.

With reference to FIGS. 1 and 2, inflatable evacuation device 12 is shown in slide mode, in accordance with various embodiments. Inflatable evacuation device 12 may comprise one or more canopy support sites 70 located on each longitudinal tube 32a, 32b. For example, inflatable evacuation device 12 may include four to seven canopy support sites 70 on each longitudinal tube 32a, 32b for a total of eight to fourteen canopy support sites 70. Canopy supports sites 70 may be defined by or coupled to a surface of upper chamber 32 and/or other portion of inflatable evacuation device 12, such as sliding surface 60.

Evacuation system 10 may further comprise a plurality of canopy supports 80 stored in canopy pouch 18. In various embodiments, upper chamber 32 and lower chamber 34 may inflate upon deployment of inflatable evacuation device 12, while canopy supports 80 remain stowed in canopy pouch 18. Canopy supports 80 are accessible by evacuees for use, such as when inflatable evacuation device 12 is used in raft-mode, but are stowed during evacuation.

In slide mode, it is desirable for inflatable evacuation device 12 to have sufficient rigidity or beam strength, when inflated, for evacuees to jump onto the inflatable evacuation device 12 and slide down. Upper chamber 32 and lower chamber 34 may each inflate to at least a minimum pressure to provide sufficient beam strength to operate as a slide. For example, a pressure of 3.0 psi (20.7 kPA) may be a minimum pressure desired for slide mode to achieve a desired beam strength. Because canopy supports 80 are separate components from inflatable evacuation device 12, the inflatable interior volume of upper chamber 32 is effectively reduced as compared to an inflatable evacuation device having inflatable canopy supports. Reducing the interior volume of upper chamber 32 results in an increase in pressure within upper chamber 32. A greater pressure within upper chamber 32 provides a greater beam strength for inflatable evacuation device 12. With a higher operating pressure, inflatable evacuation device 12 can support evacuees leaving the aircraft at a higher rate and increases overall performance of inflatable evacuation device 12 including its resistance to wind.

With reference to FIGS. 3A and 3B, a canopy support 80 is shown, in accordance with various embodiments. FIG. 3A shows a canopy support 80 is shown in a stowed position, in accordance with various embodiments. Each canopy support 80 may include a plurality of canopy support segments 82 in a telescoping arrangement. Canopy support segments 82 may comprise a series of nested hollow tubes, with the canopy support segments 82 being collapsible and with each segment fitting within an adjacent segment. For example, a second canopy support segment 82b, which may be an inner canopy support segment, may be configured to fit at least partially within a first canopy support segment 82a, which may be an outer canopy support segment, when canopy support 80 is in a stowed state. A third canopy support segment 82c may be configured to fit at least partially within second canopy support segment 82b when canopy support 80 is in the stowed state and may be configured to interlock with second canopy support segment 82b in an extended position when canopy support 80 is in the deployed state. Canopy support segments 82 may have a circular cross section or other cross section geometries, such as square, I-beam, or other hollow structure, according to various embodiments. Canopy support segments 82 may be comprised of a lightweight, rigid material, such as aluminum, anodized aluminum, polyamide or other plastic, composite, or other suitable material.

A first canopy support segment 82a, which may be an outermost canopy support segment, may be configured to couple with a canopy support site 70 (FIG. 2). A stowed height H1 of canopy support 80 is less than a deployed height H2 of canopy support 80 (see FIG. 3B). A stowed height H1 of canopy support 80 may be approximately the same height as first canopy support segment 82a. For example, a height of first canopy support segment 82a and/or stowed height H1 may be between 3 inches or 7.62 centimeters (cm) to 7 inches (17.8 cm), or between 4 inches (10.2 cm) to 6 inches (15.2 cm), or nominally 5 inches (12.7 cm). A quantity of canopy support segments 82 may be selected according to the size of each segment and according to the desired height of the canopy support 80 when deployed. For example, fewer canopy support segments 82 may be used in a design with canopy support segments 82 having a greater height.

With reference to FIG. 3B, a canopy support 80 is shown in a deployed position, in accordance with various embodiments. Canopy supports 80 may be configured to be manually deployed to an extended position and may have deployed dimensions similar to a canopy stub. Canopy support segments 82 may be configured to telescope along an axis A-A' of canopy support 80. Canopy support 80 may be deployed by pulling an innermost canopy support segment 82n along axis A-A' and away from the adjacent segments. First canopy support segment 82a may have a first axial end 84a and a second axial end 86a. Second canopy support segment 82b may have a first axial end 84b and a second axial end 86b. Second axial end 86a of the first canopy support segment 82a may interlock with a first axial end 84b of the second canopy support segment 82b when canopy support 80 is in the deployed state. Similarly, second axial end 86b of the second canopy support segment 82b may interlock with a first axial end 84c of the second canopy support segment 82c when canopy support 80 is in the deployed state. When canopy support 80 is in the deployed state, canopy support 80 has a deployed height H2. The deployed height H2 of canopy support 80 may be between 20 inches (50.8 cm) to 35 inches (88.9 cm), or between 20 inches (50.8 cm) to 30 inches (76.2 cm), or between 22 inches (55.9 cm) to 27 inches (68.6 cm). The deployed height H2 of canopy support 80 may be selected according to the size and design of inflatable evacuation device 12 (FIG. 2).

With reference to FIGS. 4A and 4B, a canopy support 90 is shown, in accordance with various embodiments. Canopy support 90 may be similar to canopy support 80 in FIGS. 3A and 3B, and may have deployed dimensions similar to a canopy support tube. Similar to canopy support segments 82, canopy support segments 92 may comprise a series of nested hollow tubes, with each canopy support segment 92 collapsible to fit within an adjacent segment. For example, a second canopy support segment 92b, which may be an inner canopy support segment, may be configured to fit at least partially within a first canopy support segment 92a, which may be an outer canopy support segment, when canopy support 90 is in a stowed state. In various embodiments, a stowed height H3 of canopy support 90 is less than a deployed height H4 of canopy support 90 (see FIG. 4B). A stowed height H3 of canopy support 90 may be approximately the same height as first canopy support segment 92a. For example, a height of first canopy support segment 92a and/or stowed height H3 may be between 3 inches or 7.62 centimeters (cm) to 7 inches (17.8 cm), or between 4 inches (10.2 cm) to 6 inches (15.2 cm), or nominally 5 inches (12.7 cm). A width W of first canopy support segment 92a may be between 0.2 inch or 5 milimeters (mm) to 1 inch (25.4 mm), or between 0.3 inch (7.6 mm) to 0.5 inch (12.7 mm), or between 0.3 inch (7.6 mm) to 0.4 inch (10.1 mm). A quantity of canopy support segments 92 may be selected according to the size of each segment and according to the desired height of the canopy support 90 when deployed. Fewer canopy support segments 92 may be used in a design with canopy support segments 92 having a greater height. For example, canopy support 90 may comprise six canopy support segments 92, each having a nominal height of 5 inches (12.7 cm).

In various embodiments, canopy support segments 92 may have a circular cross section or other cross section geometries, such as square, I-beam, or other hollow structure, according to various embodiments. Canopy support segments 92 may be comprised of a lightweight, rigid material, such as aluminum, anodized aluminum, polyamide or other plastic, composite, or other suitable material.

In various embodiments, canopy support 80 in FIGS. 3A and 3B and canopy supports 90 in FIGS. 4A and 4B may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

With reference to FIG. 4A, a canopy support 90 is shown in a stowed position, in accordance with various embodiments. A first canopy support segment 92a, which may be an outermost canopy support segment, may be configured to couple with a canopy support site 70. Canopy support site 70 may comprise a receptacle 74 for receiving canopy support 90. Inflatable evacuation device 12 may further include a canopy support attachment 72 at canopy support site 70. After placing canopy support 90 in canopy support site 70, a canopy support attachment 72 may be engaged to couple canopy support 90 to canopy support site 70. Canopy support attachment 72 may include a fastener, such as a snap, a hook and loop, strap, or other mechanical restraint for holding canopy support 90 to canopy support site 70.

With reference to FIG. 4B, a canopy support 90 is shown in a deployed position, in accordance with various embodiments. Canopy support segments 92 may be configured to telescope along an axis B-B' of canopy support 90. Canopy support 90 may be deployed by pulling an innermost canopy support segment 92n along axis B-B' and away from the adjacent segments. A deployed height H4 of canopy support 90 may be between 25 inches (63.5 cm) to 35 inches (88.9 cm), or between 27 inches (68.6 cm) to 33 inches (83.8 cm). The deployed height H4 of canopy support 90 may be selected according to the size and design of inflatable evacuation device 12 (FIG. 2). For example, a canopy support 90 comprising six canopy support segments 92, each having a nominal height of 5 inches (12.7 cm), may have a deployed height H4 of about 30 inches (76.2 cm), wherein "about" in this context only means+/−2 inches (5.1 cm).

Figure 5A:
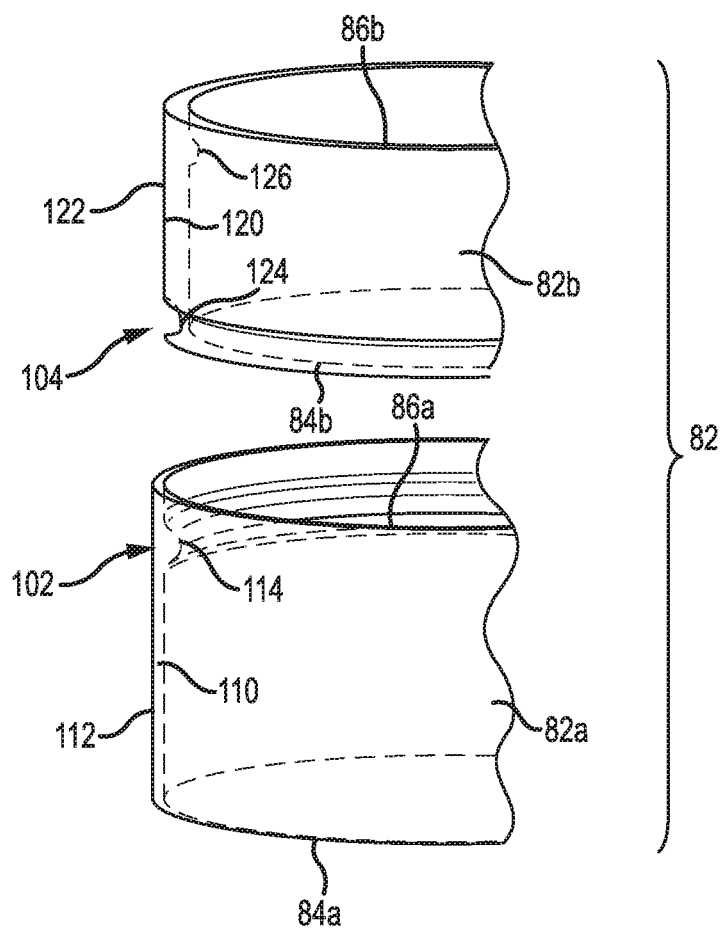
FIGS. 5A and 5B illustrate interlocking canopy support segments, in accordance with various embodiments.
Figure 5B:
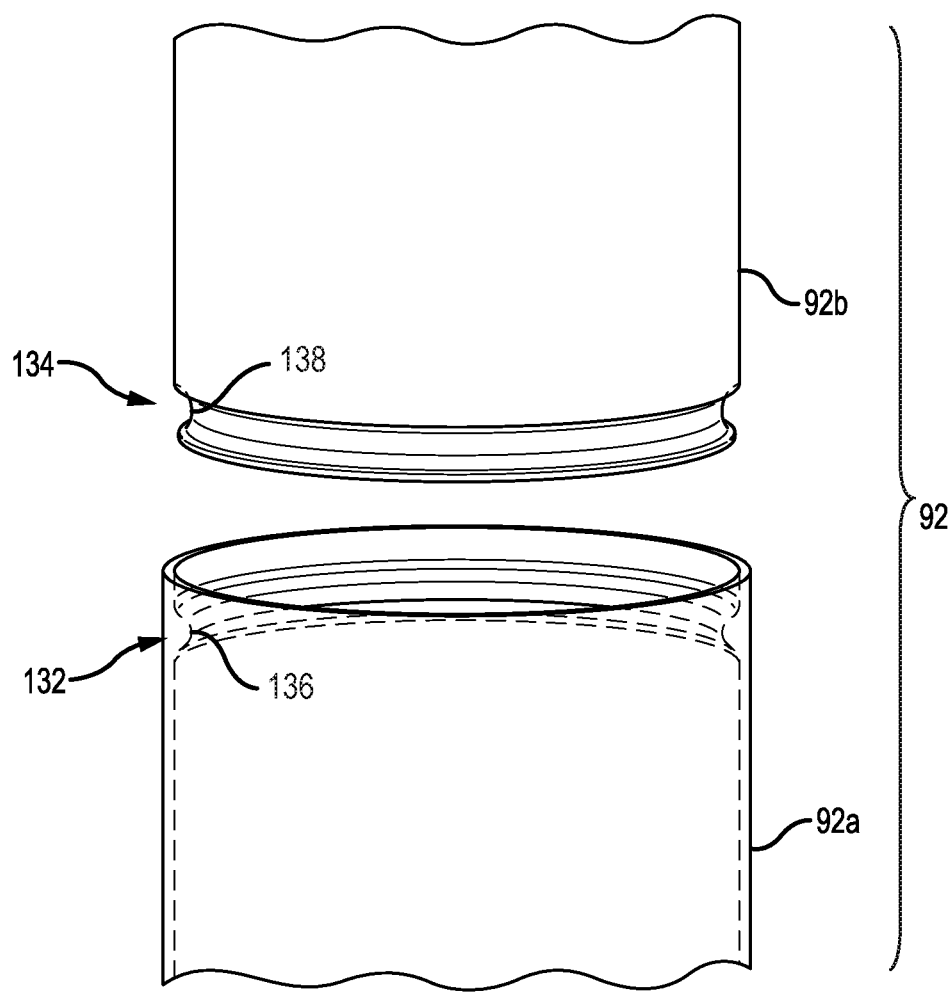

With reference to FIGS. 5A and 5B, interlocking features of canopy supports 80, 90 are shown, in accordance with various embodiments. FIG. 5A shows a portion of a canopy support 80 having a first canopy support segment 82a and a second canopy support segment 82b. First canopy support segment 82a may include a first interlocking portion 102. Second canopy support segment 82b may include a second interlocking portion 104. Second interlocking portion 104 may be configured to mate with first interlocking portion 102.

First canopy support segment 82a has an inner surface 110 and an outer surface 112. The first interlocking portion 102 may comprise a protrusion 114 on inner surface 110 of first canopy support segment 82a. Protrusion 114 may extend circumferentially along an inner surface 110 of first canopy support segment 82a or may be a plurality of discrete protrusions. Second canopy support segment 82b has an inner surface 120 and an outer surface 122. Second interlocking portion 104 may comprise a recess 124 in an outer surface 122 of the second canopy support segment 82b. Protrusion 114 may be configured to fit within recess 124. Second canopy support segment 82b may further include a protrusion 126 on inner surface 120 for interlocking with a recess of a third canopy support segment 82c (see FIG. 3B).

FIG. 5B shows a portion of a canopy support 90 having a first canopy support segment 92a and a second canopy support segment 92b. First canopy support segment 92a may include a first interlocking portion 132. Second canopy support segment 82b may include a second interlocking portion 134. Second interlocking portion 134 may be configured to mate with first interlocking portion 132. First interlocking portion 132 may comprise a protrusion 136, for example, while second interlocking portion 134 may comprise a recess 138.

With reference to FIGS. 5A and 5B, canopy support segments 82, 92 may be interlockable by complimentary interlocking lips or rims, such as flared edges. Canopy support segments 82, 92 may be friction interlocking. Canopy support segments 82, 92 may be self-interlocking such that canopy supports 80, 90 remain in a deployed position once the canopy support segments 82, 92 have been extended.

Figure 6A:
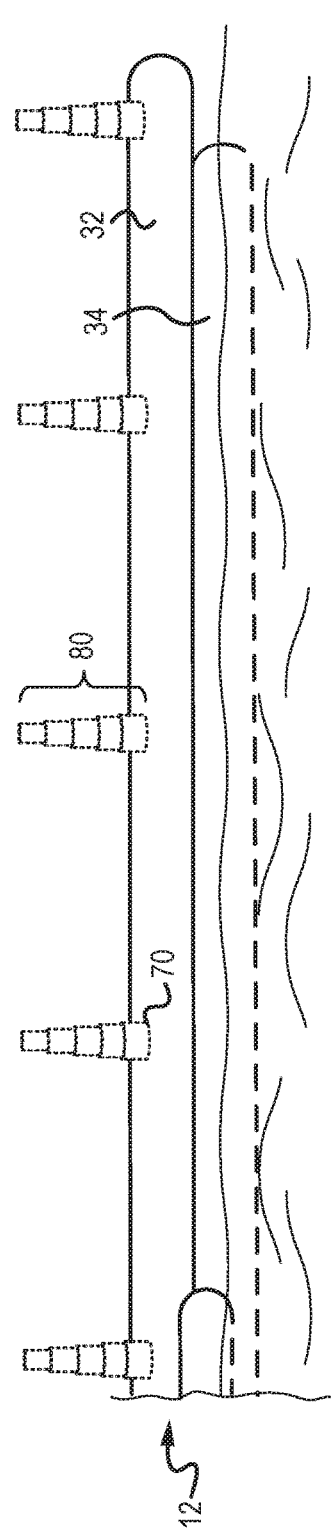

With reference to FIG. 6A, an inflatable evacuation device 12 is shown in raft mode with canopy supports 80 in a deployed position, in accordance with various embodiments. After initial deployment of inflatable evacuation device 12 and evacuation by evacuees, inflatable evacuation device 12 may be detached from the aircraft and used as a raft. Canopy supports 80 may be removed from canopy pouch 18 and installed at canopy support sites 70. Canopy supports 80 may be coupled to upper chamber 32 by a retaining member. Canopy supports 80 may be manually extended. Once installed at a canopy support site 70, a canopy support 80 may extend upward from a surface of upper chamber 32.

Figure 6B:
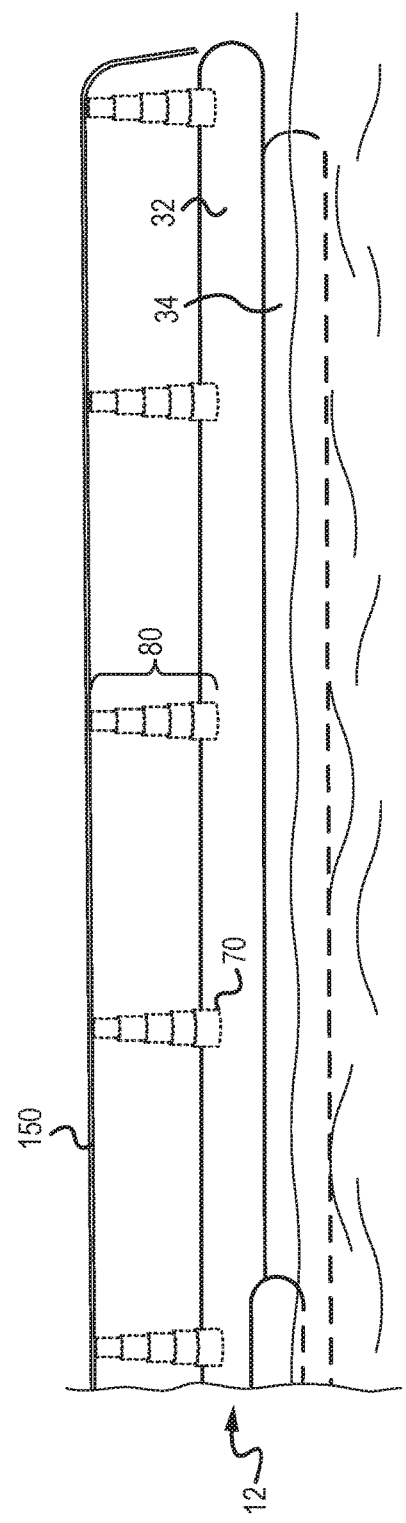

In various embodiments and with reference to FIG. 6B, an inflatable evacuation device 12 is shown with a canopy 150 supported by a plurality of canopy supports 80. In various embodiments, canopy 150 is configured to be coupled to one or more canopy supports 80 after deployment and attachment of canopy supports 80. Canopy 150 and/or canopy supports 80 may include one or more fasteners for manually coupling canopy 150 to canopy supports 80. Canopy 150 may comprise any suitable type of canopy and any suitable type of material, such as, for example, canvas, silk, nylon, ballistic nylon, aramid fiber, polyethylene terephthalate, and/or the like. Canopy supports 80 are configured to hold canopy 150 over the upper chamber 22 and sliding surface 60 (see FIG. 2) to provide cover for evacuees.

With reference to FIG. 6C, an inflatable evacuation device 12 is shown in raft mode with canopy supports 90 in a deployed position, in accordance with various embodiments. Canopy supports 90 may be removed from canopy pouch 18 and installed at canopy support sites 70. Canopy supports 90 may be coupled to upper chamber 32 by a retaining member. Canopy supports 90 may be manually extended. Once installed at a canopy support site 70, a canopy support 90 may extend upward from a surface of upper chamber 32 and outward from sliding surface 60.

With reference to FIG. 6D, an inflatable evacuation device 12 is shown in raft mode with canopy supports 80 and 90 in a deployed position, in accordance with various embodiments. Inflatable evacuation device 12 may include at least one of canopy supports 80 and at least one of canopy supports 90. Similar to FIGS. 6A and 6B, canopy supports 80 may be coupled to a canopy support site 70 on upper chamber 32. Once installed at a canopy support site 70, a canopy support 80 may extend upward from a surface of upper chamber 32. Sliding surface 60 may include one or more canopy support sites 152. Canopy support site 152 may comprise a receptacle for receiving canopy support 90, and canopy supports 90 may be configured to couple with a canopy support site 152. Canopy supports 90 may be removed from canopy pouch 18 and installed at canopy support sites 152. Canopy support site 152 may further include a fastener or other mechanical restraint for holding canopy support 90 to canopy support site 152. Once installed at a canopy support site 152, a canopy support 90 may extend upward from a surface of sliding surface 60. Canopy supports 80 and 90 may be configured to hold a canopy, such as canopy 150 from FIG. 6B, over the upper chamber 22 and sliding surface 60.

Figure 7:
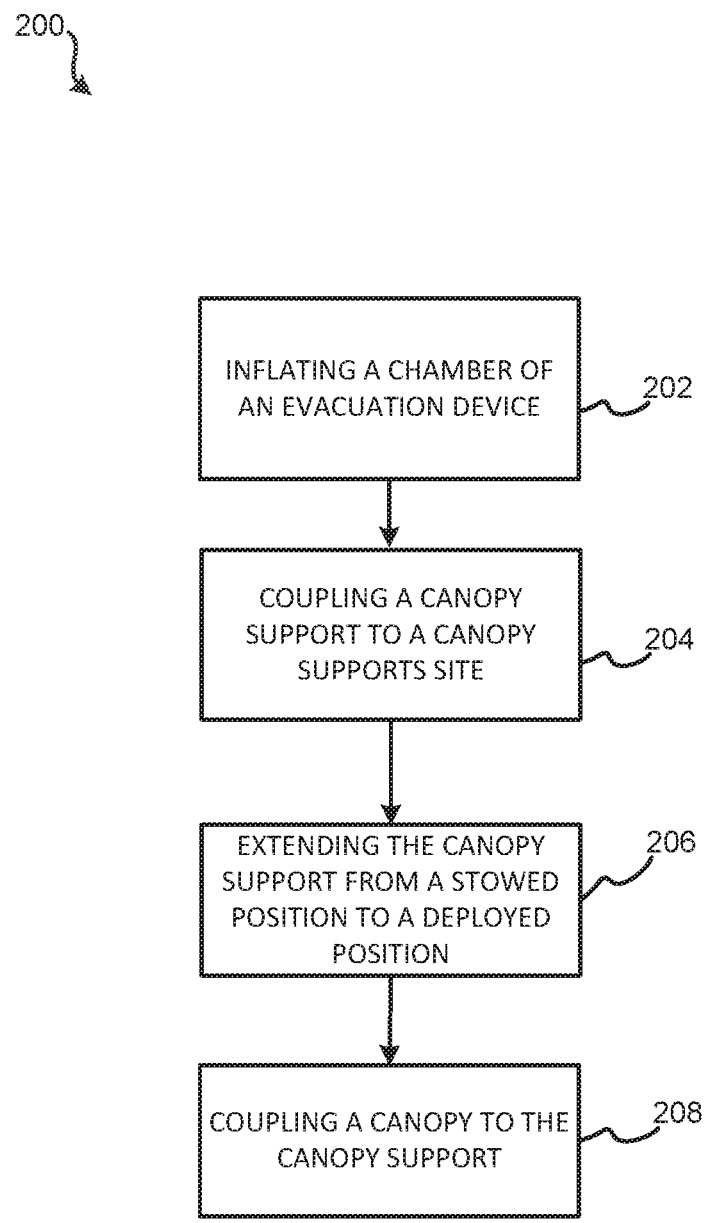
FIG. 7 illustrates a method of supporting a canopy of an inflatable evacuation device, in accordance with various embodiments.

With reference to FIG. 7, a method 200 of supporting a canopy of an inflatable evacuation device is shown, in accordance with various embodiments. Method 200 may comprise the steps of inflating a chamber of an inflatable evacuation device (step 202), coupling a canopy support to a canopy support site (step 204), extending the canopy support from a stowed position to a deployed position (step 206), and coupling a canopy to the canopy support (208). Method 200 may comprise detaching the inflatable evacuation device from an aircraft prior to coupling the canopy support to the canopy support site. Inflatable evacuation device 12 may be a slide raft and may be used as an evacuation slide and/or a life raft.

Step 202 may further comprise detaching inflatable evacuation device 12 from an aircraft to use inflatable evacuation device 12 as a life raft. Step 204 may further comprise engaging a canopy support attachment. Step 206 may further comprise manually extending the canopy support by pulling an innermost canopy support segment axially away from adjacent canopy support segments. The canopy support segments 82 may be in a telescoping arrangement and may be self-interlocking once deployed into the deployed position. The canopy support 80 comprising a first canopy support segment 82a in a telescoping arrangement with a second canopy support segment 82b. The canopy support 80 may further comprises a third canopy support segment 82c in a telescoping arrangement with the first canopy support segment 82a and the second canopy support segment 82b.

Figure 8:
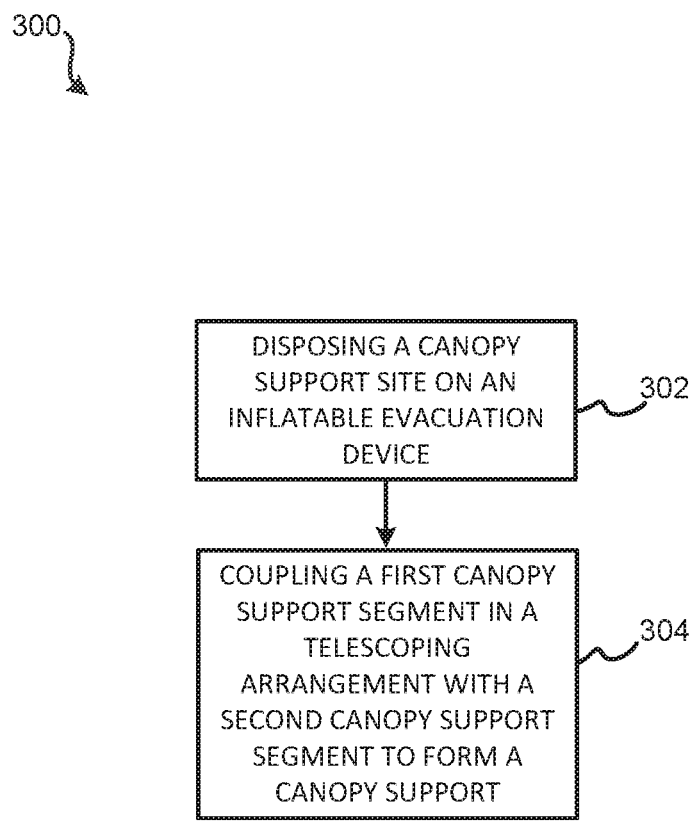
FIG. 8 illustrates a method of supporting a canopy of an inflatable evacuation device, in accordance with various embodiments.

With reference to FIG. 8, a method 300 of supporting a canopy of an inflatable evacuation device is shown, in accordance with various embodiments. Method 300 may comprise the steps of disposing a canopy support site on the inflatable evacuation device (step 302), and coupling a first canopy support segment in a telescoping arrangement with a second canopy support segment to form a canopy support (304). The second canopy support segment may be configured to fit at least partially within the first canopy support segment when the canopy support is in a stowed state. The canopy support may comprise a plurality of canopy support segments in a telescoping arrangement such that the plurality of canopy support segments are configured to be telescopically extended and locked into the extended position. The canopy support may be configured to fit into the canopy support site. The inflatable evacuation device may comprise a slide raft.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable evacuation device, comprising:
    a telescopic canopy support segment having:
        a first canopy support segment, and
        a second canopy support segment configured to fit at least partially within the first canopy support segment when the telescopic canopy support is in a stowed state and configured to interlock with the first canopy support segment in an extended position when the telescopic canopy support is in a deployed state; and
    a canopy configured to couple to the telescopic canopy support;
    wherein the first canopy support segment of the telescopic canopy support extends within an inflated volume of an inflatable member of the inflatable evacuation device when in the deployed state.

2. The inflatable evacuation device of claim 1, wherein an axial end of the first canopy support segment interlocks with an axial end of the second canopy support segment when the telescopic canopy support is in the deployed state.

3. The inflatable evacuation device of claim 1, wherein the first canopy support segment includes a first interlocking portion, and
    wherein the second canopy support segment includes a second interlocking portion, the second interlocking portion configured to mate with the first interlocking portion.

4. The inflatable evacuation device of claim 3, wherein the first interlocking portion comprises a protrusion on an inner surface of the first canopy support segment, and
    wherein the second interlocking portion comprises a recess in an outer surface of the second canopy support segment.

5. The inflatable evacuation device of claim 1, wherein a stowed height of the telescopic canopy support in the stowed state is between 10.2 centimeters to 15.2 centimeters, and wherein a deployed height of the telescopic canopy support in the deployed state is between 50.8 centimeters to 88.9 centimeters.

6. The inflatable evacuation device of claim 1, wherein the telescopic canopy support is comprised of at least one of aluminum or polyamide.

7. An evacuation system, comprising:
    an inflatable evacuation device including:
        a canopy support attachment;
        a telescopic canopy support coupled to the inflatable evacuation device at a canopy support site via the canopy support attachment,
        the telescopic canopy support comprising a first canopy support segment in a telescoping arrangement with a second canopy support segment; and
        a canopy configured to couple to the telescopic canopy support,
    wherein the first canopy support segment of the telescopic canopy support extends within an inflated volume of an inflatable member of the inflatable evacuation device when in the deployed state.

8. The evacuation system of claim 7, wherein the second canopy support segment is configured to fit at least partially within the first canopy support segment when the telescopic canopy support is in a stowed state.

9. The evacuation system of claim 8, wherein the second canopy support segment is configured to interlock with the first canopy support segment in an extended position when the telescopic canopy support is in the deployed state.

10. The evacuation system of claim 9, wherein an axial end of the first canopy support segment interlocks with an axial end of the second canopy support segment when the telescopic canopy support is in the deployed state.

11. The evacuation system of claim 10, wherein a stowed height of the telescopic canopy support in the stowed state is between 10.2 centimeters to 15.2 centimeters, and wherein a deployed height of the telescopic canopy support in the deployed state is between 50.8 centimeters to 88.9 centimeters.

12. The evacuation system of claim 7, wherein the inflatable evacuation device comprises a slide raft.

13. A method of supporting a canopy of an inflatable evacuation device, comprising:
    disposing a canopy support site on the inflatable evacuation device;
    disposing a first canopy support segment within the canopy support site, wherein the canopy support site extends within an inflated volume of an inflatable member of the inflatable evacuation device;
    coupling the first canopy support segment at the canopy support site;
    coupling the first canopy support segment in a telescoping arrangement with a second canopy support segment and a third canopy support segment to form a telescopic canopy support; and
    coupling the canopy to the telescopic canopy support.

14. The method of claim 13, wherein the second canopy support segment is configured to fit at least partially within the first canopy support segment when the telescopic canopy support is in a stowed state.

15. The method of claim 13, wherein the telescopic canopy support comprises a plurality of canopy support segments in the telescoping arrangement such that the plurality of canopy support segments are configured to be telescopically extended and locked into an extended position.

16. The method of claim 13, wherein the telescopic canopy support is configured to fit into the canopy support site.

17. The method of claim 13, wherein the inflatable evacuation device comprises a slide raft.

* * * * *